United States Patent [19]

McCarthy et al.

[11] Patent Number: 4,560,047
[45] Date of Patent: Dec. 24, 1985

[54] SOLENOID OPERATED CLUTCH ENGAGEMENT

[75] Inventors: James P. McCarthy, Inkster; Richard E. Byler, Livonia, both of Mich.

[73] Assignee: Ford Motor Company, Dearborn, Mich.

[21] Appl. No.: 425,192

[22] PCT Filed: Aug. 4, 1982

[86] PCT No.: PCT/US82/01061
  § 371 Date: Aug. 4, 1982
  § 102(e) Date: Aug. 4, 1982

[51] Int. Cl.⁴ ............................................. F16D 25/14
[52] U.S. Cl. ................................. 192/52; 137/596.16; 137/625.64; 192/85 AA; 192/109 F
[58] Field of Search ................... 192/3.57, 52, 85 AA, 192/109 F; 91/28, 29, 32, 33; 137/596.16, 596.18, 625.64

[56] References Cited

U.S. PATENT DOCUMENTS

| | | | |
|---|---|---|---|
| 2,807,968 | 10/1957 | Forster | 192/109 F |
| 3,215,236 | 11/1965 | Pensa | 192/109 F X |
| 3,351,170 | 11/1967 | Hengstler | 192/109 F |
| 3,680,410 | 8/1972 | Sumiyoshi et al. | 74/866 |
| 3,727,487 | 4/1973 | Forster et al. | 137/625.24 X |
| 3,754,482 | 8/1973 | Sanders et al. | 74/752 A |
| 3,935,793 | 2/1976 | Murakami | 192/109 F X |
| 3,948,146 | 4/1976 | Maurer et al. | 192/109 F X |
| 3,964,506 | 6/1976 | Grundman | 192/109 F |
| 3,991,865 | 11/1976 | Komatsu | 192/109 F |
| 4,086,994 | 5/1978 | Hirosawa et al. | 192/87.19 X |

Primary Examiner—Rodney H. Bonck
Attorney, Agent, or Firm—Frank G. McKenzie; Donald J. Harrington

[57] ABSTRACT

An electrical solenoid operates a three-way valve having a vent port, a port connected to a source of high pressure hydraulic fluid and a port connection to a pilot valve. A check valve supplied from a source of low pressure hydraulic fluid is connected to the cylinder of a clutch or servo of an automatic transmission when a pilot valve opens this communication upon energizing the solenoid coil. The clutch cylinder is depressurized through the pilot valve to the vent port of the solenoid-operated valve.

11 Claims, 1 Drawing Figure

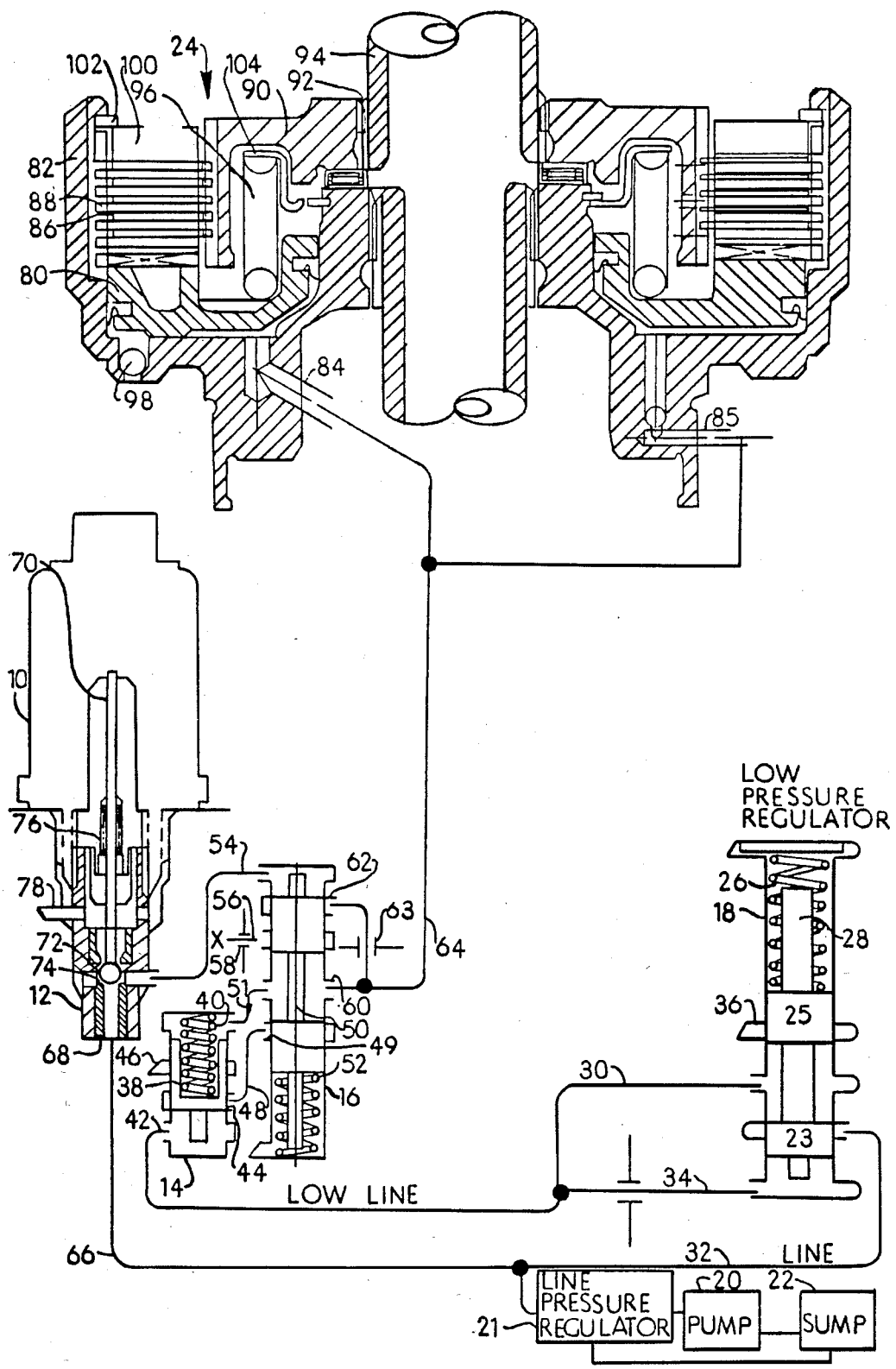

SOLENOID OPERATED CLUTCH ENGAGEMENT

BACKGROUND OF THE INVENTION

1. Field of the Invention

This invention relates to the hydraulic control circuit of an automatic transmission and more particularly to such a control circuit for quickly pressurizing and quickly venting the cylinder of a clutch or servo through operation of a solenoid operated control valve.

2. Prior Art

It is known in the art that fluid capacity modulator valves and accumulators can operate together to smooth gear ratio upshift changes by controlling the rate at which the associated clutch is applied. When the upshift begins the capacity modulator valve produces a reduced or regulated pressure, which is applied to the operative clutch and to the spring of an accumulator. The accumulator is filled and pressure regulation continues until it is fully filled. Thereafter, regulation ceases and line pressure is directly applied to the clutch cylinder to complete the engagement. Such hydraulic systems provide gradual or rapid pressure build-up depending upon the conditions and the requirements indicated by movement of a control valve.

A desirable control feature of solenoid operated hydraulic control systems is optimized shift quality. It is undesirable to have a shift between gear ratios that extends for a very short time because it produces a noticable and objectionable rapid change in vehicle acceleration producing a harsh shift. On the other hand, if the period for engagement of the selected clutch or servo extends for too long, excessive heat and wear on the friction elements used to produce the desired coupling or braking of the gear elements results. Accordingly, the preferred engagement of a clutch or servo of an automatic transmission is long enough to avoid the objectionable harsh shifting that results when the engagement is too fast yet short enough to avoid excessive heat and wear that results if the engagement is unduly protracted.

SUMMARY OF THE INVENTION

The hydraulic cylinder within which the actuating piston of a hydraulic clutch moves is pressurized selectively in order for the piston to apply a variable hydraulic force to friction discs, which are mechanically joined alternately to one or the other of two elements of the torque delivery path of the transmission. The early portion of the period during which the cylinder is pressurized is used to take up design clearances and tolerances, component deflections and the clearances that result due to wear of the thickness of the clutch discs and brake bands. Preferably, this initial pressurization phase should occur rapidly and at low pressure so that the cylinder of the clutch is filled quickly and the piston moved rapidly until the clutch discs are brought into abutting contact with one another or until the brake band engages the brake drum. The hydraulic force applied to the piston of the servo or clutch should not be sufficient to prevent relative movement between the elements of the torque delivery path to be coupled. After the piston has moved the friction elements into contact, a larger pressure force must be applied to the piston so that the clutch or servo can complete its engagement. Preferably this should be controlled to avoid harsh engagement as the hydraulic pressure in the cylinder increases at a rate sufficient to couple the drive elements quickly but without impact or excessive noise.

In order to disengage the clutch or servo the cylinder should be rapidly vented. This permits the spring to return the piston to the opposite end of its travel as rapidly as hydraulic forces remaining within the piston will permit without abrupt contact and noise.

It is therefore an object of this invention to provide a hydraulic control system for pressurizing or depressurizing friction clutches and servos of an automatic transmission to produce smooth engagement of the coupled elements without causing excessive noise, wear and impact. A more specific object of this invention is to provide a solenoid operated valve for modulating the rate at which high pressure is applied to the clutch cylinder during the period when the clutch produces the coupling action between elements of the torque delivery path. It is another object of this invention that the hydraulic system rapidly fills the clutch cylinder at relatively low hydraulic pressure during the early portion of the clutch engagement until the pressure within the clutch cylinder reaches a predetermined value. The hydraulic system thereafter disconnects the source of low pressure fluid, applies high pressure fluid slowly to the clutch cylinder and modulates the application of high pressure fluid during the period of clutch engagement that follows the low pressure, high volume fill portion of the engagement process.

In realizing these and other objectives of the invention the hydraulic system according to this invention includes a check valve through which a low pressure source of hydraulic fluid communicates with the clutch cylinder through a pilot valve until the pressure within the cylinder reaches a predetermined magnitude that operates to close the check valve. This predetermined pressure occurs when the cylinder of the clutch is filled to the point where the piston has brought the several clutch discs into mutual abutting engagement or the brake band into engagement with the brake drum. A solenoid operated valve thereafter communicates a source of relatively high pressure hydraulic fluid through the pilot valve to the clutch piston. The system operates to depressurize the clutch cylinder by venting the cylinder through the pilot valve and the solenoid valve until the pressure within the clutch cylinder reaches a vent pressure after which the venting to sump occurs through the pilot valve alone.

BRIEF DESCRIPTION OF THE DRAWING

The FIGURE shows a hydraulic system operated by an electrical solenoid valve used to quickly fill the clutch cylinder at relatively low hydraulic pressure during initial clutch engagement and to quickly vent high pressure hydraulic fluid from the cylinder during the early stages of the disengagement.

DESCRIPTION OF THE PREFERRED EMBODIMENT

Referring to the FIGURE, the hydraulic control system for pressurizing and depressurizing a friction device, such as a clutch or servo, of an automatic transmission includes a solenoid 10, a valve 12 operated by the solenoid, a check valve 14, a pilot valve 16, a low pressure regulator valve 18, a positive displacement pump 20, a reservoir or sump 22 connected to the inlet of the pump, and a clutch 24. The pump will deliver fluid as long as it is turning and supplied with fluid at its inlet, the volume being in proportion to the drive speed.

The pump is designed to deliver more fluid than the transmission needs; the excess fluid volume is recirculated to the sump by a pressure regulator system that maintains line pressure within acceptable limits. The vent ports of the valves of the system are connected to the sump which is open to the atmosphere.

The low pressure regulator valve 18 has three stages of operation. In the first stage while hydraulic pressure is low, spring 26 holds regulator valve spool 28 in the closed position allowing hydraulic line 30 to be filled through the regulator valve chamber and line 32 from the pump. When the lines are filled, pressure in the system begins to rise and fluid in control passage 34 applies a pressure force to spool 28 in opposition to the force of spring 26. This causes spool 28 to move upward in the chamber, which movement first closes supply line 32 and later, if the spool moves further against the spring, opens the space between lands 23, 25 of the spool to vent port 36. This action drops the pressure in line 30 and in control line 34 tending to return the spring to its original position where line pressure is again supplied to valve 18. Therefore, the pressure in line 30 is regulated by balancing the pressure force on the spool caused by the pressure in the control passage 34 against the force of the valve spring 26. The spring controls the pressure and the valve adjusts itself automatically so that the spring force is equal to the hydraulic pressure force. If the pressure drops, the spring moves the valve and stops flow to the sump. If the pressure rises, the valve moves against the spring and bypasses more oil to the sump. In this way, fluid at a pressure below line pressure is supplied to the check valve by selecting an appropriate spring constant for spring 26.

Check valve 14 has a light spring 40 that applies a force to spool 38, which moves against the spring due to a pressure force developed on the end face of spool 38 to open and close communication between inlet port 42 and outlet port 44. Vent port 46 carries hydraulic fluid that may leak between the outer surface of the spool and the valve chamber within which the spool moves.

Pilot valve 16 is supplied with fluid through line 48 from check valve 14. Spool 50, biases by spring 52, opens and closes line 48 in response to the force of spring 52, and the control pressure force developed on the end of spool 50 by hydraulic fluid within control passage 54. The chamber of valve 16 has a vent port 56 that communicates with the sump through an orifice 58. A clutch cylinder port 60 and a high pressure port 62 communicate with the hydraulic cylinder of clutch 24 through line 64.

The outlet side of pump 20 is connected through line pressure regulator 21 and line 66 to the high pressure inlet 68 of solenoid valve 12. The impact pin 70 moves downward facing ball 72 into contact with the ball seat 74 when the coil of the solenoid is energized, thereby closing high pressure inlet 68. Spring 76 biases the impact pin upward to its normally open position, to which ball 72 returns due to oil pressure at inlet port 68 when the coil is not energized. In the open position, high pressure inlet 68 communicates with control passage 54, but inlet 68 and control passage 54 are closed to vent port 78. When the coil is energized and ball 72 moves to the closed position, control passage 54 communicates directly with the sump through vent port 78 and inlet 68 is closed.

Clutch 24 is a generic term meaning any device adapted to couple or hold portions of the gearset of an automatic transmission. Examples include a forward clutch, direct clutch, intermediate/overdrive clutch or low/reverse servo, which causes a brake band to tighten around a carrier drum. Clutch 24 includes a hydraulic piston 80 which is moved axially within a cylinder formed in the clutch housing 82 due to the effects of hydraulic fluid that enters and leaves the cylinder through ports 84,85 and the force of a spring 96. The clutch includes internally splined plates 86 and alternating externally splined plates 88. Plates 86 are splined to a driving hub 90 which is splined at 92 to a gear element 94 of a planetary gearset. Plates 88 are splined to the clutch housing 82. Therefore, hydraulic pressure applied to the clutch piston forces the plates together and produces frictional force between the plates that connect the clutch housing 82 to the gear element 94. Alternatively, a clutch of this type may be used to hold the gear element against rotation by coupling it to the transmission housing. A clutch spring 96 applies a force to piston 80 in opposition to the pressure force developed on the piston, thereby returning the piston to the position shown in the figure when hydraulic pressure is removed from the cylinder. In this way the clutch housing is disconnected from the gear element.

Clutch 24 as illustrated in the FIGURE is in the depressurized state. When it is required to produce coupling or holding action, the clutch should preferably first have hydraulic fluid at relatively low pressure enter the cylinder so that the spacing between plates 86, 88 can be rapidly taken up and the disc pack held firmly against the backup pressure plate 100. Relatively low pressure hydraulic fluid initially applied to the cylinder closes check valve 98, the clearances within the disk pack are removed, and the hydraulic force working against the spring force maintains the discs in frictional contact one with another. The pressure force on the piston is, however, not great enough to couple gear element 94 to clutch housing 82. This process of initially filling the cylinder with low pressure fluid should be accomplished rapidly and requires a relatively large volume of fluid to fill the cylinder. As piston 80 moves axially inward, spring 96 is compressed between the surface of piston 80 and spring retention member 104. The spring constant, determines the magnitude and the rate of increase of the hydraulic fluid pressure during the initial fill process. When the pressure within the cylinder reaches a predetermined magnitude as described hereinbelow, the hydraulic control system discontinues the application of low pressure hydraulic fluid and opens the clutch piston to the source of high pressure hydraulic fluid. The high pressure fluid applies to the piston a greater pressure force whose magnitude will be determined by the on-off cycling or pulse width modulation of solenoid 10 and which is of sufficient magnitude to couple the gear element to the clutch housing or to hold the gear element against rotation. After the low pressure supply of hydraulic fluid to the clutch is discontinued and high pressure fluid is applied, the periods during which the solenoid coil is energized operate to increase the pressure within the clutch cylinder as required to maintain an effective coupling of the drive member to the clutch housing. The harsh, abrupt engagement, which normally requires accumulators to moderate and control, is avoided.

In operation of the conical system, low pressure hydraulic fluid is supplied from low pressure regulator valve 18 through line 30 and port 42 to the check valve 14. The pressure force developed on the face of piston 38 works in opposition to the force of spring 40 to open outlet port 44. Initially, passage 48 is closed by pilot valve spool 50 which is biased by spring 52 to the closed position when the cylinder of clutch 24 is exhausted and in the general position indicated in the FIGURE. In order to fill the cylinder of clutch 24, the coil of the solenoid as deenergized and ball 72 moves off seat 74 due to the action of compression spring 76. Control passage 54 thereby applies high pressure fluid to the end face of valve spool 50 causing spring 52 to compress, thus opening inlet port 49 of pilot valve 16. Hydraulic fluid at low pressure carried through line 64 into the cylinder of the clutch through port 84 fills the cylinder quickly until the pressure therein reaches the shut-off pressure as determined by spring 40. Hydraulic pressure fed back in line 51 to the spring side of check valve piston 38 applies a hydraulic force to piston 38 that adds to the force of spring 40. When the pressure within the cylinder of clutch 24 has reached the predetermined shut-off magnitude, which preferably is in the range of 10 psi, check valve piston 38 closes port 44. This action terminates the filling of clutch cylinder with low pressure hydraulic fluid.

The pressure force on the end of valve spool 50 acting against the force of spring 52 opens port 62 as well as port 49 to line 64. Thereafter fluid at line pressure is connected from line pressure regulator 21, through line 66, valve 12, line 54, port 62, orifice 63, and line 64 to clutch 24. Because the clearances within the clutch were closed during the low pressure fill, little if any flow is required to maintain the pressure in the clutch at the high pressure level. Therefore, after the clutch is filled there is no pressure drop across orifice 63 and the clutch pressure is equivalent to line pressure. During low pressure filling of the clutch, the pressure drop across orifice 63 reduces the line pressure in line 54 toward the outlet pressure of regulator valve 18 so that low pressure fluid fills clutch 24 until the shut-off level is reached and pilot valve 14 closes. Thereafter, until communication between the clutch cylinder and high pressure inlet 68 of the solenoid valve is closed, pressure force on clutch piston 80 operates to drivably connect the clutch housing to gear element 94 and completes the pressurization process.

In order to depressurize the clutch, the coil of solenoid 10 is energized, thereby closing communication with the source of high line pressure 68 and opening line 54 to vent port 78. This opens communication between the clutch cylinder and vent port 78 by way of ports 84, 85, line 64, port 62, line 54 and the solenoid valve 12. When this communication is opened, hydraulic fluid is quickly vented from the clutch cylinder. The pressure in the clutch cylinder falls from about 270 psi, but a brief period is required for clutch pressure to reach the second predetermined pressure at which pilot valve 16 returns to its first state. When high pressure in the clutch cylinder falls to approximately 15 psi, spool 50 of the pilot valve moves to the upper end of its chamber thereby closing port 52 and opening port 56, which communicates with the sump through orifice 58. When the pressure in line 64 drops sufficiently, the pressure on the upper surface of pilot valve 16 also drops. This reduced pressure in line 64 allows valve 14 to be pushed upward by the pressure from line 42. Check valve 14 is now in the upward position and line 48 is pressurized. However since pilot valve 16 is now upward, port 49 is closed and the pressure is deadheaded in preparation for the next cycle. After this occurs, clutch piston 80 is moved by clutch spring 96 to the extreme lower end of the clutch cylinder and the rest of the hydraulic fluid is vented through pilot valve 16 and vent port 56 to the sump. There is, therefore, a difference of approximately 5 psi maintained between the check valve shut-off pressure and the pilot valve vent pressure.

Having described the preferred embodiment of our invention, what we claim and desire to secure by U.S. Letters Patent is:

1. A hydraulic control system for pressurizing and venting the cylinder of an automatic transmission clutch comprising:

a source of fluid at low pressure;

a source of fluid at higher pressure;

a first valve for communicating the low pressure source to an outlet port and for closing said communication when the pressure in the clutch cylinder reaches a first predetermined pressure;

a second valve for communicating the outlet port to the clutch cylinder when the high pressure source is connected to a control chamber of the second valve; and a third valve including an electrical solenoid having a valve element whose position is controlled by the state of the electrical solenoid, for opening the high pressure source to the control chamber, closing the high pressure source from the control chamber and venting the control chamber.

2. The system of claim 1 wherein the first valve includes:

a valve spool biased by a spring to close the outlet port;

an inlet port connected to the low pressure source for admitting fluid at low pressure and developing a pressure force on the valve spool in opposition to the spring force; and a feedback port through which clutch cylinder pressure enters the first valve and develops a pressure force on the valve spool assisting the spring force, whereby the outlet port is opened due to the effect of low pressure fluid and the outlet port is closed if the effect of the feedback pressure and spring force exceeds the effect of the low pressure fluid.

3. The system of claim 1 wherein the second valve includes:

a spool biased by a spring to a first position having a first land thereon for opening and closing the outlet port to the clutch cylinder; and a control chamber communicating with the third valve for developing a pressure force on the second valve spool opposing the spring force.

4. The system of claim 3 wherein the second valve further includes:

a high pressure port through which the clutch cylinder and control chamber communicate;

a clutch cylinder port through which the low pressure source communicates with the clutch cylinder when the outlet port is open; and a vent port, wherein the second valve spool has a second land thereon, which, in its first position, closes the high pressure port and opens communication between the clutch cylinder and the vent port and wherein the spool, in its second position, opens the high pressure port to the control chamber, closes the vent port and opens the outlet port.

5. The system of claim 4 wherein the third valve includes:

a valve element movable between first and second states;

a vent port connected to sump;

a high pressure inlet connected to the high pressure source;

a port connected to the control chamber;

a spring urging the valve element to a first state at which the high pressure port is opened to the control chamber port; and a solenoid for moving the valve element to a second state when the solenoid is energized, at which state the high pressure port is closed and the vent port is opened to the control chamber.

6. The system of claim 5 wherein the clutch is disengaged by energizing the solenoid, whereby the clutch cylinder is opened to the vent port of the third valve until the clutch pressure falls to the second predetermined pressure and whereby the clutch cylinder is thereafter opened to the vent port of the second valve.

7. The system of claim 5 wherein the solenoid modulates the communication of the high pressure source and the clutch cylinder while the clutch is engaged.

8. The system of claim 1 wherein the third valve includes:

a valve element movable between first and second states;

a vent port connected to sump;

a high pressure inlet connected to the high pressure source;

a port connected to the control chamber;

a spring urging the valve element to a first state at which the high pressure port is opened to the control chamber port; and a solenoid for moving the valve element to a second state when the solenoid is energized, at which state the high pressure port is closed and the vent port is opened to the control chamber.

9. The system of claim 8 wherein the solenoid modulates the communication of the high pressure source and the clutch cylinder while the clutch is engaged.

10. The system of claim 1 wherein the clutch is disengaged by energizing the solenoid, whereby the clutch cylinder is opened to the vent port of the third valve until the clutch pressure falls to the second predetermined pressure and whereby the clutch cylinder is thereafter opened to the vent port of the second valve.

11. A hydraulic control system for hydraulically engaging and disengaging an automatic transmission clutch having a clutch cylinder comprising:

a source of fluid at low pressure;

a source of fluid at high pressure;

a first valve for opening the low pressure source to an outlet port and for closing said communication if the pressure within the clutch cylinder reaches a predetermined value;

a second valve for opening the outlet port to the clutch cylinder if the high pressure source is connected to a control chamber of the second valve, and for closing said communication if the clutch cylinder pressure reaches a second predetermined pressure; and a third valve having a valve element whose position is controlled by the state of an electrical solenoid adapted to open the high pressure source to the control chamber and to close the high pressure source from the control chamber, which closure vents the control chamber.

* * * * *